United States Patent [19]

Hare et al.

[11] 4,066,158

[45] Jan. 3, 1978

[54] CHUTE CONSTRUCTION

[75] Inventors: William C. Hare, Chattanooga, Tenn.; Milton F. Collier, Orlando, Fla.

[73] Assignee: Cumberland Corporation, Chattanooga, Tenn.

[21] Appl. No.: 720,386

[22] Filed: Sept. 3, 1976

[51] Int. Cl.² .............................................. B65G 11/12
[52] U.S. Cl. ...................................... 193/34; 312/211
[58] Field of Search .................... 193/4, 5, 8, 33, 34, 193/17, 3; 312/86, 211, 237; 211/195; 232/44

[56] References Cited

U.S. PATENT DOCUMENTS

| | | | |
|---|---|---|---|
| 1,536,642 | 5/1925 | Wall | 193/34 |
| 1,707,011 | 3/1929 | Heybeck | 193/34 |
| 2,500,058 | 3/1950 | Brundage | 193/33 X |
| 3,095,073 | 6/1963 | Larson et al. | 193/33 |

*Primary Examiner*—Evon C. Blunk
*Assistant Examiner*—James L. Rowland
*Attorney, Agent, or Firm*—Cushman, Darby & Cushman

[57] ABSTRACT

A storage chamber means is shown having a chute for communicating between the outside and the storage area wherein the chute is designed to cooperate with an entrance aperture in a wall to permit articles to be fed into the storage chamber through the chute, yet the chute substantially seals the entrance to the chamber against removal of articles from the chamber once they have been delivered into the storage area through the aperture. The chute is also designed to be collapsed into a compact panel and hinged into out of the way position for covering the entrance aperture and locked in place from the inside of the chamber to close the aperture against unauthorized opening whereby to provide a secure storage facility having a maximum of storage space in this mode of use which space is unencumbered with a chute structure.

14 Claims, 6 Drawing Figures

CHUTE CONSTRUCTION

BACkGROUND

In many situations it is necessary to sort and store small packages including bags of mail and other valuables. Open and portable canvas containers are usually provided at postal stations and other forwarding facilities for such items. In many cases where such package handling facilities are used, security is a problem. The present invention provides a relatively inexpensive but adequate answer to the security problem while retaining the advantages of a simple, inexpensive portable structure, with substantial capacity for storage.

BRIEF DESCRIPTION

A secure storage chamber is shown that may easily be made portable where such characteristic is desireable. The chamber is provided with an infeed chute structure adapted to receive articles or packages to be stored for delivering the package into the enclosed storage space. The chute cooperates with an entrance window to the storage chamber to close the window when the chute is not in use and to also make it practically impossible to remove an article from the storage chamber once an article or package has been dropped into the enclosed chamber through the chute.

The chute is made to be collapsible so that it may be folded up to form a compact panel. When so collapsed, the chute structure does not occupy space in the storage chamber so that more effective use of the storage space may be made. In the collapsed panel form, the chute is moved into a position to cover the entrance aperture to the chamber and the panel may be locked in place and when the doors are also locked, a secure storage facility is provided for valuable articles that must be protected against pilferage while in transit in the mail or other express systems available to industry and the public.

IN THE DRAWINGS

Figure 5:
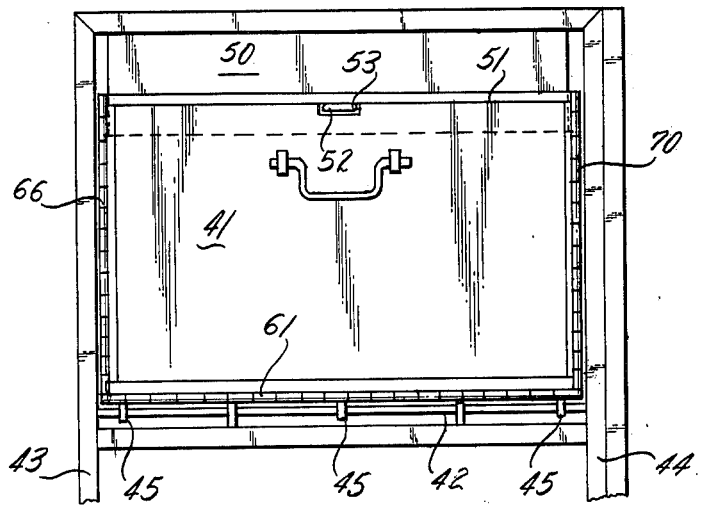
Figure 6:
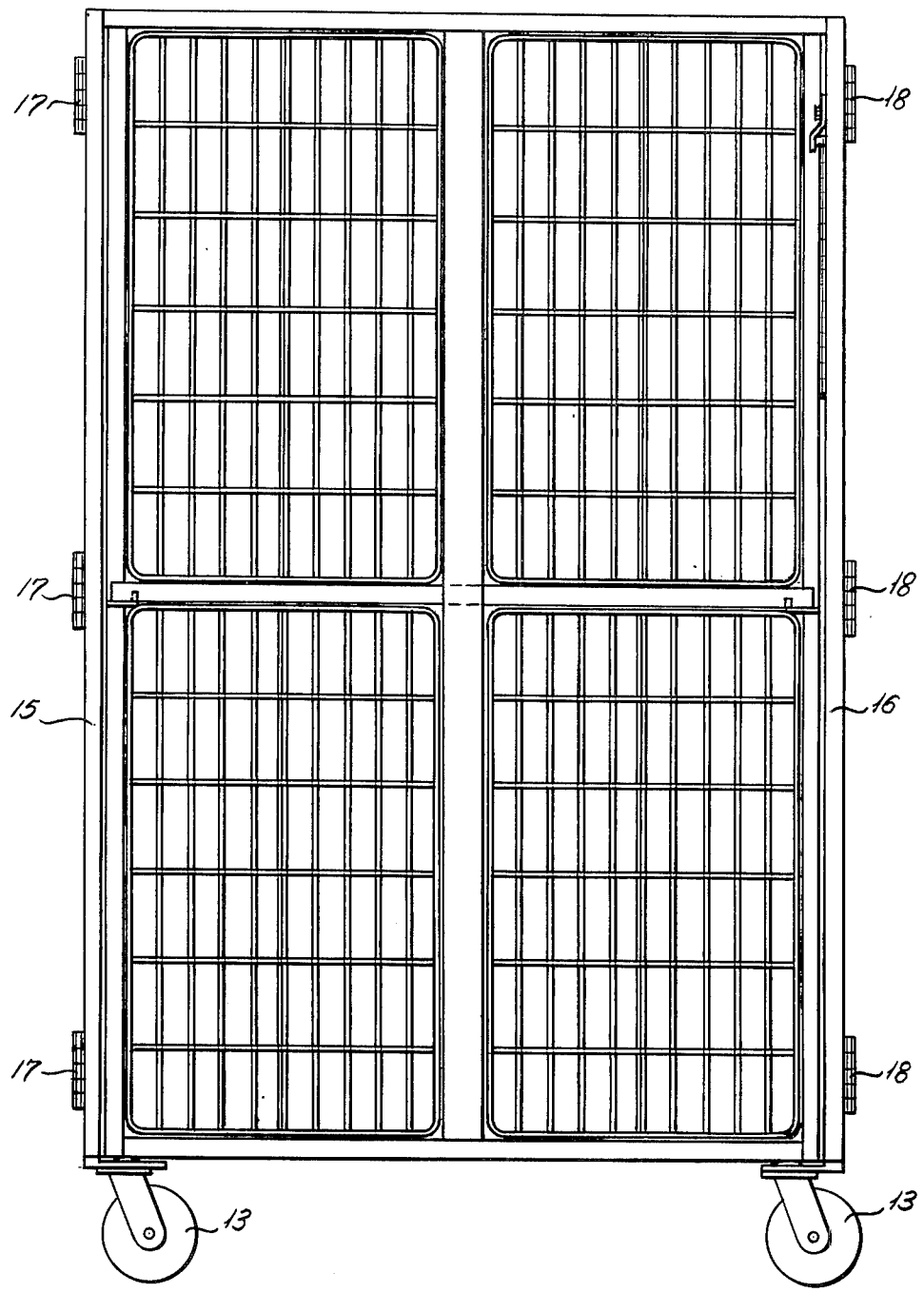

FIG. 5 is a view from outside the structure showing a panel section in the floor of the chute covering the inlet aperture to the chamber, where the chute can be locked in place for securely closing the entrance aperture to the chamber; and FIG. 6 is a front view looking into the chamber through the open doors in a wall, showing the chute folded into a panel form and locked, from the inside, over the entrance aperture to the chamber.

DETAILED DESCRIPTION

Any storage chamber adapted to be filled through either a door or a chute may utilize the invention here shown but in its preferred form, the storage container 10 is shown to be portable for use in express or mail handling facilities and the like. The container may be made in any size to receive and store the packages to be handled in the normal use to which the container is put and it may be constructed with walls on all six sides to securely protect the packages to be stored. As shown herein, the walls are formed of vertically disposed bars 11 and horizontal bars 12 closely spaced together and formed of hardened steel welded securely in place. The floor and ceiling may be solid elements and the bottom of the chamber may be provided with caster wheels 13 on each of the four corners to make the chamber portable.

Figure 1:
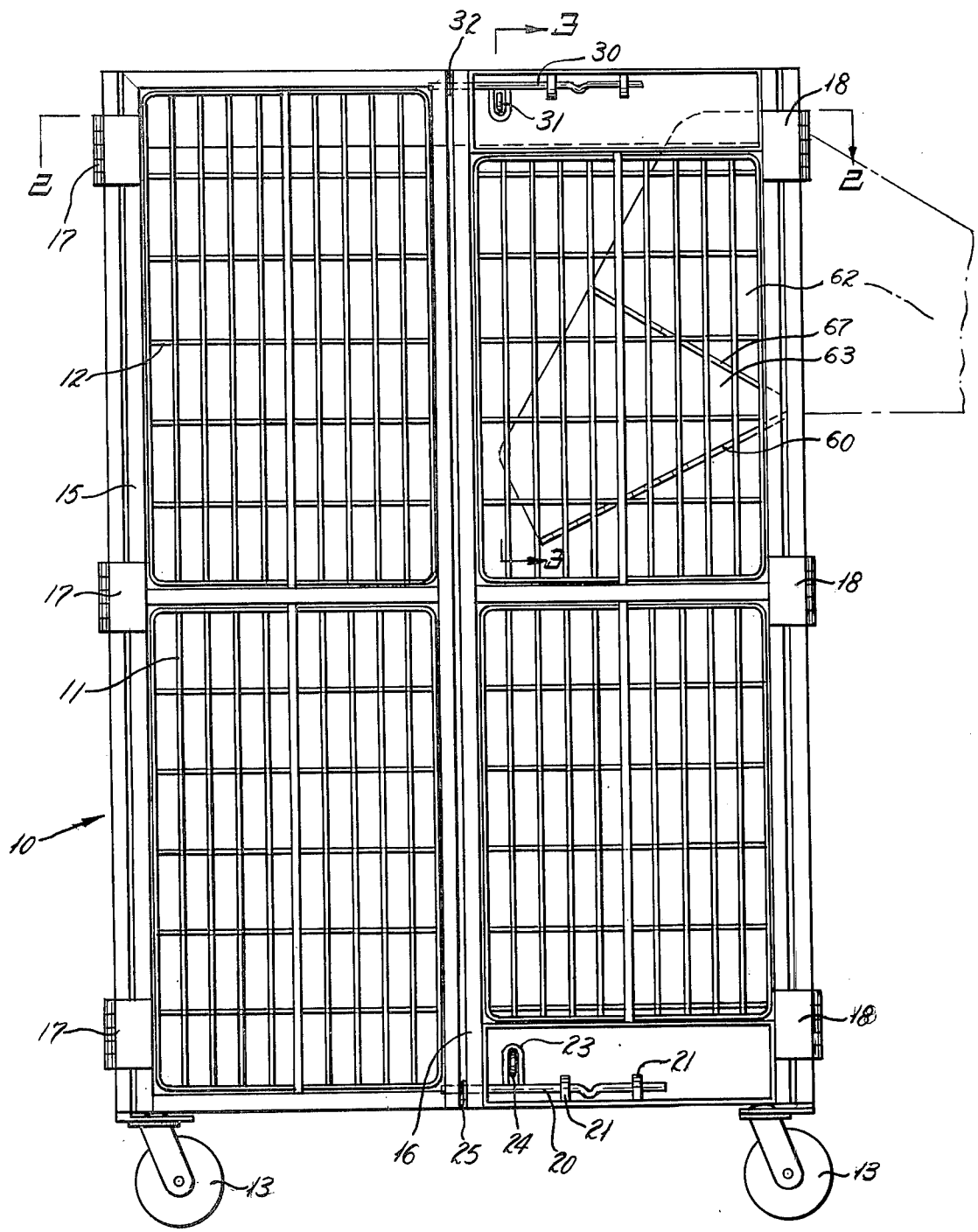
FIG. 1 is a side elevation showing the preferred assembly.
Figure 2:
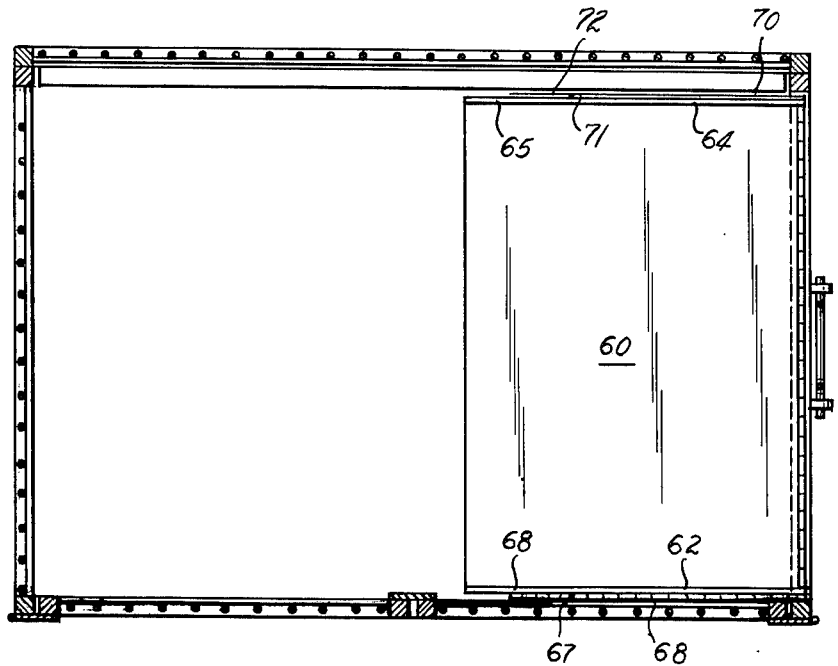
FIG. 2 is a sectional top view taken on line 2—2 of FIG. 1.
Figure 3:
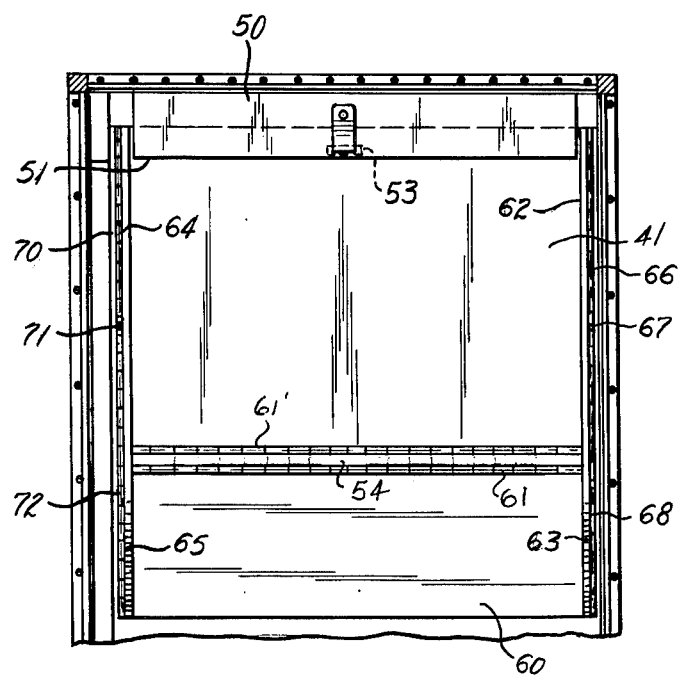
FIG. 3 is a view looking from the inside of the chamber at the chute from along line 3—3 of FIG. 1.

One complete side wall of the chamber may be formed of two hinged door member 15 and 16. The left hand door 15, shown in FIG. 1 is supported on hinges 17 and door 16 is carried on hinges 18. The doors are normally closed and suitable bolt and lock means are provided to secure the doors in a closed and locked position. Sliding and rotating bolt 20 at the bottom of the door 16 is supported in spaced bearings 21 integral with a support panel 22 forming a part of the door. The bolt has an integral loop 23 adapted to cooperate with a staple 24 fixed to panel 22 and the bolt is elongated to extend beyond the edge of door 16, through a fixed staple 25 fixed to the floor of the chamber, and into a suitable receptacle in the bottom edge of door 15. A padlock or other type of lock may be secured to staple 24 when the chamber is to be locked to prevent the unauthorized removal of bolt 20. When the lock is removed, the bolt 20 may be rotated to free loop 23 from staple 24 and then the bolt may be slid to the right as viewed in FIG. 1 to remove the free end of the bolt from its engagement with door 15 and staple 25 in order to unlock the ends of doors 15 and 16. The upper ends of the doors may be provided with a similar rotating and sliding bolt 30 that may be locked to secure the doors 15 and 16 at their upper ends. Bolt 30 cooperates with bearing supports and staples to hold the doors locked but bolt 30 may likewise be unlocked, and then rotated and slid out of engagement with door 16 to permit the doors to both swing open on their hinges when both locks have been removed from staples 24 and 31 and bolts 20 and 30 are retracted.

The chamber is also provided with another entrance aperture 40 in one of its walls, as shown in FIG. 5. This aperture is designed to cooperate with a chute that can be opened or closed as may be necessary to deliver packages into the storage chamber and in FIG. 5 a panel section 41 forming a part of the floor of the chute, is shown covering the aperture. The panel section is hinged to the wall of the chamber above the bottom edge of the aperture on a suitable bearing axis 42 integral with frame members 43 and 44 that form the corner elements of the chamber. The panel 41 supports integral hinge members 45 that are rotatably carried on rod 42 so that the panel 41 may swing from the closed position shown in FIG. 5 to the open position shown in dotted lines in FIG. 1.

The top edge of the entrance aperture 40 is defined by a lip 50 formed integral with the frame of the chamber. The panel 41 has an integral flange 51 adapted to seat along the outside of the bottom edge of lip 50 and a staple 52 may be welded to lip 50 to extend through a cooperating aperture 53 in flange 51 to receive a lock for holding the panel 41 secured in a closed position. When unlocked, the chute may be swung about rod 42 to uncover aperture 40 through which articles may be delivered into the chute to be dumped into the storage area within chamber 10 when the chute is tipped in the other direction.

Figure 4:
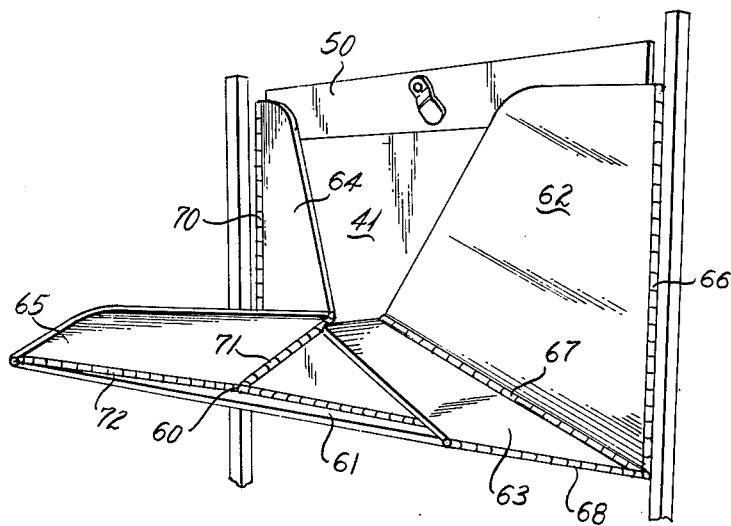
FIG. 4 is a perspective view looking from inside the chamber at the chute in a partially collapsed mode.

The floor of the chute includes two panel sections 41 and 60 that are hinged together with a flat spacer 54 and two piano type hinges 61 and 61'. The hinge 61 engages panel 41 and spacer 54 and has an axis spaced from but generally parallel to the axis of the bearing bar 42. The hinge 61' engages spacer 54 and panel 60. The chute is further defined by wall elements on each side, the wall on one side being formed of panel sections 62 and 63, see FIG. 1, and the wall on the other side is formed of identically sized panel sections 64 and 65. The wall panel 62 is hinged to a side edge of panel 41 along its one edge that is contiguous thereto, with a piano hinge 66 and it is hinged to panel section 63 with a piano hinge 67. The side wall panel section 63 is hinged to floor panel section 60 of the chute with piano hinge 68 along its edge that is contiguous thereto. The hinges 66, 67 and 68 are arranged to permit the panel sections 62 and 63 to fold inwardly over the floor portion of the chute as shown in the partially collapsed mode illustrated in FIG. 4. The corresponding panel sections 64 and 65 that constitute the opposed side wall of the chute are likewise hinged to panel 41 with hinge 70, to each other with hinge 71 and to floor section 60 with hinge 72. These wall sections 64 and 65 likewise fold inwardly as suggested in FIG. 4. The four panels forming the two walls and the bottom panel section 60 are adapted to be ultimately collapsed together to form a flat panel that is adapted to cover aperture 40. The collapsed panel section 60 bears against the inside surface of lip 50 and any suitable lock such as latch 80 or other more positive locking device may be used to lock the collapsed panel in the upright position.

It is seen that with this structure, a container is provided that is adapted to receive articles placed in the chamber through open doors 15 and 16 or dropped into the chamber through the chute formed of the several panels hinged together as described above, when the chute is in its unfolded mode and is opened to the dotted line position shown in FIG. 1. The door 41 of the chute that is normally secured to lip 51, may be unlocked and swung open from the lip and the article or articles to be deposited may be dropped into the chamber when the door 41 is closed and the bottom of the chute formed of unfolded panels 41 and 60 tilts toward the chamber. It will be noted that the chute made up of the unfolded floor and wall panels cooperates with the entrance aperture 40 to preclude anyone from reaching into the chamber to remove any articles once an article drops off of the chute and falls into the chamber. The angle of the floor panels, one relative to the other, and the position and shape of the side panel sections can be selected to make serrepitious removal of articles through the chute entrance practically impossible.

In other situations, the chute may not be needed, yet a lockable and secure storage chamber may be useful. In this instance, the chute may be collapsed by folding the hinged panel sections of the floor and side elements together to form the collapsed panel shown in FIG. 5 of the drawings. The collapsed panel may be locked in place from the inside of the chamber to provide such a secure storage means that may be loaded through the door. Even though the chute section or panel 41 may be opened to expose aperture 40, when the floor section 60 has been collapsed into the panel form and locked from inside, a secure storage facility is provided.

The chamber as above suggested, may be made in any size to suit the requirements of the user. It may be made as a stationary unit but preferably a portable chamber is provided. While I have described the preferred form of my invention in this specification, it is possible that many modifications thereof may occur to those skilled in the art that will fall within the scope of the following claims.

We claim:

1. A storage chamber having walls and a door means to provide access thereto, and a chute structure for also providing access to said chamber comprising an aperture in one of said walls, a chute having a floor and side walls, said chute being hinged at the aperture in a manner to close the aperture when the chute is not in use and said chute receiving a package for delivery into said chamber when hinged to an open position, said chute gently dumping said package into said chamber when the chute is turned toward the closed position, said floor and walls of said chute precluding access into the storage chamber to retrieve a package once it has been dumped into the chamber, and said floor and walls of said chute being constructed and arranged to be folded and collapsed into a flat planar shape to be locked in place to close said aperture when said chamber is being loaded through said door means.

2. A structure as in claim 1 wherein said chamber is a portable container.

3. A structure as in claim 1 wherein locking means are provided to lock the chute in closed position over said entrance aperture.

4. A structure as in claim 1 wherein locking means are provided on the inside of said chamber to lock said collapsed chute in panel form over said entrance aperture.

5. A storage chamber enclosed by walls and having an entrance aperture of limited area in one of said walls and hinged door means in another of said walls to permit stored articles to be removed from said chamber, in combination with a chute structure for controlling access to said chamber through said entrance aperture, said chute having floor and wall elements; comprising horizontally disposed hinge means at said entrance aperture, cooperating hinge means on the underside of the floor of said chute for permitting the floor of said chute to be locked about said hinge from a position closing said entrance aperture to a position allowing articles to be placed in said chute for delivery into said chamber for storage, a portion of said floor and the wall elements of the chute cooperating with said entrance aperture and extending into said chamber in a manner to preclude access into the portion of the storage area of said chamber beyond said chute after an article has been deposited therein, said floor of the chute and of said wall elements of the chute being formed of separate panel sections hinged together to permit the chute to be folded into a collapsed flat panel that does not occupy any useful storage space in the chamber when the chute is not needed.

6. A structure as in claim 5 wherein said panel sections of the floor are adapted to be folded into parallel planar positions with said folded wall sections positioned between said floor sections.

7. A structure as in claim 5 wherein additional horizontal hinge means connect said panel sections of the floor of the chute in a manner to fold upwardly into parallel planar positions and hinge means are provided along the side edges of said wall sections contiguous to each of the edges of the other sections of the chute to permit said wall sections to be folded to positions between said floor sections.

8. A structure as in claim 5 wherein each of said panel sections forming the floor of said chute are equal sized rectangles with horizontal and vertical edges when folded and said panel sections forming said wall elements each have a height that is less than one-half the longest horizontal edge of either one of said folded floor panel sections.

9. A structure as in claim 5 wherein the entrance aperture is defined by rectangularly disposed edges, and said chute has a concentric rectangular cross-sectional shape, the upper edge of said entrance forming a downwardly extending lip, said chute being hinged about a horizontal axis adjacent the lower edge of said entrance, one of said panel sections of the floor engaging against the outside of said lip to close the entrance and the other of said panel sections of the floor engaging against the inside of said lip when said chute is folded into said collapsed flat panel.

10. A structure as in claim 9 wherein locking means are provided so that said one panel section can be locked to the outside of said lip.

11. A structure as in claim 9 wherein locking means are provided so that said other panel section can be locked against the inside of said lip.

12. A structure as in claim 9 wherein locking means are provided so that both said one panel section can be locked to the outside of said lip and said other panel section can be locked against the inside of said lip.

13. A structure as in claim 12 wherein said chamber is a portable container in which said panel sections of the floor are adapted to be folded into parallel planar positions with said folded wall sections positioned between said floor sections.

14. A structure as in claim 12 wherein said chamber is a portable container having additional hinge means provided along the side edges of said wall sections contiguous to each of the edges of the other sections of the chute to permit said wall sections to be folded to positions between said floor sections.

* * * * *